United States Patent [19]

Shelton

[11] Patent Number: 4,728,245

[45] Date of Patent: Mar. 1, 1988

[54] POWER ASSISTED HAND TRUCK

[76] Inventor: James A. Shelton, 1124 Sutter Ave., Modesto, Calif. 95315

[21] Appl. No.: 868,971

[22] Filed: May 30, 1986

[51] Int. Cl.$^4$ ............................................... B60P 1/18
[52] U.S. Cl. ..................................... 414/490; 280/47.2
[58] Field of Search ................ 280/47.2, 47.21, 47.29, 280/5.3, 5.32; 414/490, 444

[56] References Cited

U.S. PATENT DOCUMENTS

| | | | |
|---|---|---|---|
| 1,539,933 | 6/1925 | Britton | 280/47.29 |
| 1,827,209 | 10/1931 | Robbins | 414/490 |
| 2,570,256 | 10/1951 | Lyons | 414/490 |
| 3,363,787 | 1/1968 | Macomber | 414/444 |
| 3,416,682 | 12/1968 | Pezzuti | 280/47.2 |
| 3,805,979 | 4/1974 | Stoltz | 414/444 |
| 3,907,138 | 9/1975 | Rhodes | 280/47.29 |
| 4,091,942 | 5/1978 | Shelton | 280/47.2 |

FOREIGN PATENT DOCUMENTS 1393169 7/1965 France ................ 280/47.2

Primary Examiner—David M. Mitchell
Attorney, Agent, or Firm—Townsend and Townsend

[57] ABSTRACT

An improved power assisted hand truck includes a lower frame and an upper, upwardly extending, tilting frame for supporting a load in generally upright and rearwardly tilting orientations. The upper frame is tilted forward by a first hydraulic actuator mounted between the lower and upper frame portions. To stabilize the hand truck while raising the load, a stabilizer, pivotally mounted to the frame, is driven by a second hydraulic actuator mounted between the frame and the stabilizer. The first and second actuators are powered by a hand pump. Pressurizing the retract port of the second actuator causes the stabilizer to move until it contacts the ground. Continued pressurization of the retract port causes the second hydraulic actuator to pull the upper frame towards its rearwardly tilting position. The extend port of the second actuator is then pressurized slightly to cause the stabilizer to pivot away from the ground. The load is lowered by pressurizing the extend port of the first actuator.

12 Claims, 5 Drawing Figures

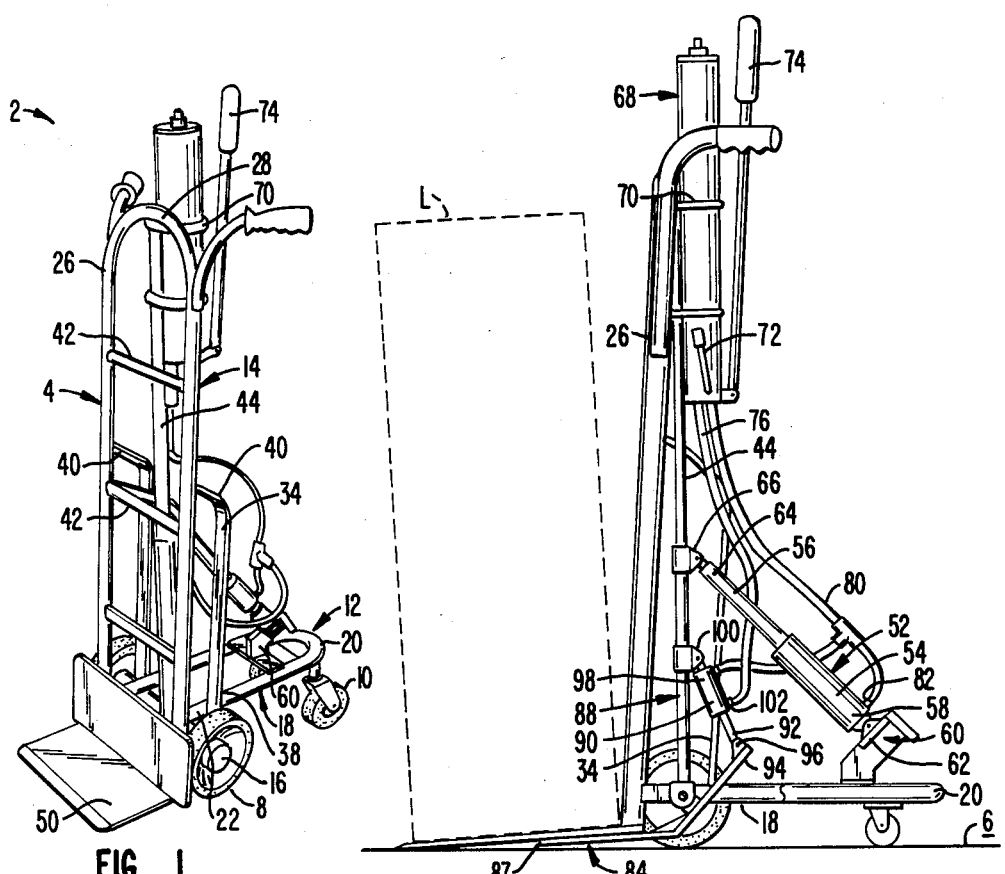
FIG._1.
FIG._3A.
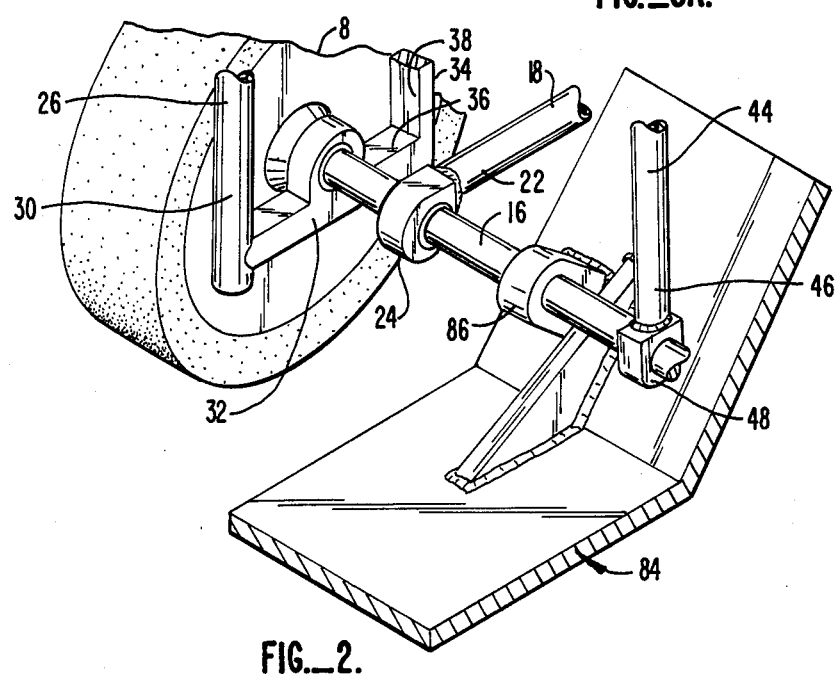
FIG._2.

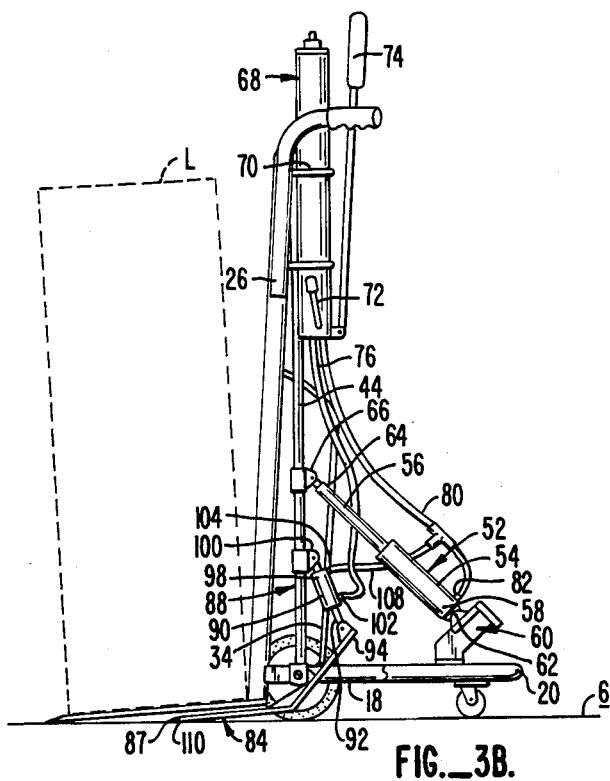
FIG._3B.
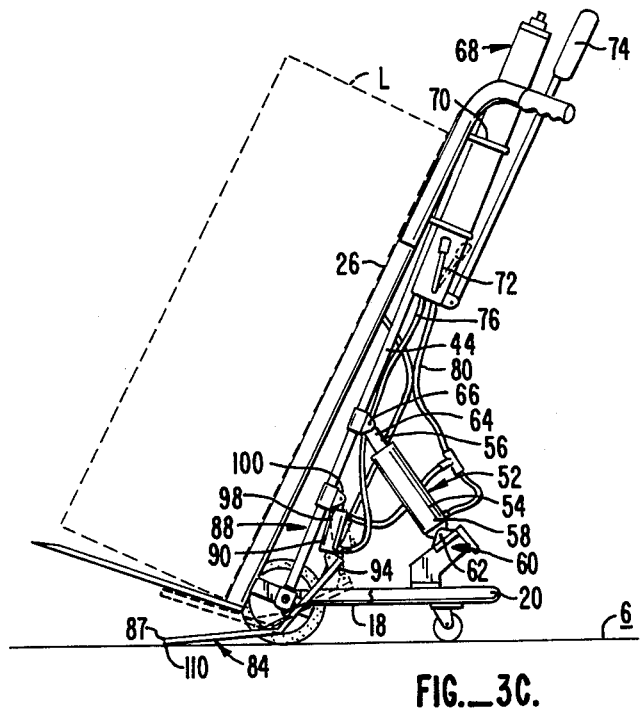
FIG._3C.

POWER ASSISTED HAND TRUCK

BACKGROUND OF THE INVENTION

The invention relates to hand trucks, in particular hand trucks designed for heavy loads with front and rear wheels and in which raising and lowering of the load is assisted by a power source, such as hydraulicly actuated pistons and cylinders.

One of the problems with moving large loads about an area using conventional hand trucks is that it often takes a great deal of effort to move the load between its generally upright position on the support surface or ground and its loaded position on the rearwardly tilted hand truck. As an aid in doing so, power assisted hand trucks have been developed See, for example, U.S. Pat. No. 4,091,942 issued May 30, 1978, to the present inventor.

A problem with many of the prior art powerassisted hand trucks is that while moving the load from its upright position to its rearwardly tilting, loaded position, at which it is carried by the hand truck, the rear or back end of the hand truck has a tendency to pitch forward about its front wheels. This movement must therefore be restricted by the user, such as by pressing down on the back end of the hand truck with the user's foot. Doing so can be quite difficult at times, especially when the load is very heavy, has an eccentrically positioned center of gravity or is positionally unstable.

SUMMARY OF THE INVENTION

The hand truck made according to the present invention solves one of the problems associated with prior art hand trucks by eliminating the tendency of the hand truck to pitch forward during loading.

The improved power assisted hand truck includes a frame having a lower, generally horizontal frame portion to which front and rear support wheels are mounted, and an upwardly extending, tilting frame portion adapted for supporting a load. The two frame portions are pivotally mounted to one another so that the upper frame portion can pivot between a generally upright orientation and a rearwardly tilting orientation. The forward tilting of the frame is controlled primarily by a first piston and cylinder combination (first hydraulic actuator) pivotally mounted at its outer ends between a first position on the lower frame portion and a second position on the upper frame portion. The cylinder is connected to a hydraulic pump through a hydraulic lower line which allows the user to selectively extend the first piston rod thus driving the upper frame portion toward its upright orientations so to lower the load.

A stabilizer is used to keep the hand truck stable and the rear end from pitching forward while raising the load. The stabilizer is pivotally mounted to the frame between a support surface engaged position, in which the stabilizer presses against the support surface or ground, and a support surface disengage position, in which the stabilizer does not touch the support surface. The stabilizer presses against the support surface at a contact position well forward of the front wheels so that any forward pitching of the hand truck must be about such contact position rather than about the front wheels. This movement of the stabilizer is through a second cylinder and piston rod combination (second hydraulic actuator) mounted between a third position on the stabilizer and a fourth position on the upper frame portion.

Pressurizing the retract port of the second hydraulic actuator through a hydraulic lift line causes its piston rod to retract so to pivot the upright frame portion rearwardly, after the stabilizer has made contact with the ground, so to raise the load.

Initially, with the upper frame portion in its upright orientation and the stabilizer spaced apart from the ground, the stabilizer is caused to engage the ground by pressurizing the hydraulic lift line which causes the second hydraulic actuator to retract. Since there is no load on a stabilizer, it moves first until it contacts the ground. When it does so the pressurization of the retract port of the second cylinder causes the second hydraulic actuator to pull back on the upper frame portion thus moving it towards its rearwardly tilting position. Once in the rearwardly tilting position, the selector switch on the pump is changed and the hydraulic lower line is pressurized slightly. The hydraulic lower line is connected to the extend ports of the first and second cylinders. The initial pressurization causes the stabilizer to pivot away from the ground and move to its travel position. After it has done so, pressurization of the lower line is halted since any further pressurization would cause the first piston rod to start to extend and lower the load.

After reaching one's destination, the load is lowered by pressurizing the lower line. In the preferred embodiment, the stabilizer is positioned so that in its travel position it rests against the underside of the load support platform. Therefore pressurizing the hydraulic lower line tends to maintain the stabilizer against the load support platform in opposition to the lowering of the load. Because the first cylinder applies a greater torque to the upper frame portion than the torque applied by the second cylinder through the stabilizer, the first cylinder drives the upper frame portion from the tilted to the upright position.

An advantage of the invention is its simplicity. No separate controls for the two different hydraulic actuators are needed. A single hydraulic lift line is used when the load is being lifted and tilted backward while a common hydraulic lower line is used when the load is being lowered and tilted forward. The user need merely pump the hydraulic pump and move the pump selector switch to its raise and lower positions. No other valves or other controls are needed.

Other features and advantages of the invention will appear from the following description in which the preferred embodiment has been set forth in detail in conjunction with the accompanying drawings.

BRIEF DESCRIPTION OF THE DRAWINGS

FIG. 1 is a perspective view of a hand truck made according to the present invention.

FIG. 2 is an enlarged isometric view of a portion of the hand truck of FIG. 1 adjacent the front axle with the load support platform removed for clarity.

FIGS. 3A, 3B and 3C show the hand truck of FIG. 1 lifting an object shown in dashed lines.

DETAILED DESCRIPTION OF THE PREFERRED EMBODIMENT

Referring now to FIG. 1, a hand truck 2 made according to the invention includes a frame 4 supported on a support surface 6 by wheels 8, 10. Frame 4 includes a lower frame portion 12 and an upper frame portion 14, portion 12 being generally horizontal while portion 16 is generally upwardly extending. Frame portions 12, 14 are pivotally coupled to one another through a front axle 16 to which wheels 8 are mounted at either end. See FIG. 2.

Lower frame portion 12 includes a U-shaped member 18 to which rear wheels 10 are mounted at its rounded end 20. Rear wheels 10 are caster wheels to aid turning hand truck 2. The spaced-apart, distal ends 22 of U-shaped member 18 are supported on front axle 16 by bearing blocks 24 to which outer ends 22 are secured, such as by welding.

Upper frame portion 14 includes a U-shaped front support tube 26 having a curved upper end 28. The spaced-apart, lower ends 30 of tube 26 are supported by a bearing block 32 positioned along axle 16 adjacent wheels 8. A lower end 38 of a generally L-shaped brace 34 extends from an end 36 of bearing block 32 on the rearward side of front axle 16 while its upper end 40 is welded to front support tube 26 medially along its length.

Upper frame portion 14 also includes a number of transverse supports 42 and a center support tube 44 extending from upper end 28 to axle 16. Support tube 44 is supported at its lower end 46 by bearing block 48. An L-shaped load support platform 50 is mounted to front support tube 26 at its lower ends 30.

To aid moving upper frame 14 from its rearwardly tilted or traveling position of FIG. 3C to its generally upright, loading position of FIG. 3A, a first hydraulic actuator 52, including a first hydraulic cylinder 54 and a first piston rod 56, is pivotally mounted to lower and upper frame portions 12, 14. The base end 58 of first cylinder 54 is pivotally secured to a foot support 60 at a first pivot point 62, foot support 60 being rigidly mounted to lower frame member 18. The distal end 64 of first piston rod 56 is pivotally secured to center support tube 44 at a second pivot point 66. Hydraulic actuator 52 is powered by hydraulic hand pump 68 secured to the upper end of center support tube 44 by mounting bands 70.

First piston rod 56 is extended by first placing a selector switch 72 in its "lower" position, shown in dashed lines in FIG. 3C, and then pumping handle 74. This causes hydraulic fluid to flow through hydraulic lower line 80 connected to an extend port 82 of first cylinder 54.

To add stability while lifting a load L, a dog-legged shaped stabilizer 84 is pivotally mounted to axle 16 by a pair of bearing blocks 86 positioned on either side of bearing block 48. The outer end 87 of stabilizer 84 is positioned a substantial distance forward of front axle 16, typically underlying a portion of load L. The forward positioning of outer end 87 helps to stabilize hand truck 2 during lifting of load L as is discussed below. Stabilizer 84 is pivoted about front axle 16 by a second hydraulic actuator 88. Actuator 88 includes a second cylinder 90 and a second piston rod 92, the distal end of which is pivotally secured to the upper edge 94 of stabilizer 84 at a third pivot point 96. The upper end 98 of second cylinder 90 is pivotally secured to center support tube 44 at a fourth pivot point 100. Cylinder 90 includes retract and extend ports 102, 104. Retract port 102 is fluidly connected to hydraulic lift line 76 while extend port 104 is connected to hydraulic lower line 80 by a connection line 108. Pressurizing hydraulic lift line 76 causes second piston rod 92 to retract thus pivoting stabilizer 84 counterclockwise so that its outer edge 87 contacts support surface 6 at a fulcrum point 110 as shown in FIG. 3B. By doing so two advantages are achieved. First, the tendency of hand truck 2 to move about support surface 6 is greatly reduced because of the frictional contact at fulcrum point 110. Second, the tendency of rounded end 20 of lower frame portion 12 to pitch forward and raise up off surface 6 during lifting of load L is greatly reduced since fulcrum point 110 is much farther forward than axle 16 and is more nearly directly under load L.

Assuming hand truck 2 is in the configuration of FIG. 3A with a load L on platform 50, to lift the load the user first places selector switch 72 in the "raise" position and then pumps handle 74. This pressurizes lift line 76 causing hydraulic fluid to flow through retract port 102 and into second hydraulic cylinder 90. Initially, the movement of piston rod 92 will result only in the pivotal movement of stabilizer 84 because no initial resistance to the counterclockwise pivoting of stabilizer 84 is encountered. Once outer end 87 of stabilizer 84 contacts support surface 6 at fulcrum point 110, further pivotal movement of stabilizer 84 is substantially halted. This position is shown in FIG. 3B. Further hydraulic fluid flows into retract port 102 of second cylinder 90 thus causing second piston rod 92 to retract pivoting upper frame portion 14 clockwise thus lifting load L until the position of FIG. 3C is achieved.

At this point, stabilizer 84 will still be touching support surface 6. To raise outer end 87, selector switch 72 is moved to the "lower" position, shown in dashed lines, and handle 74 is pumped a small amount. This initial pumping causes hydraulic fluid to flow through hydraulic lower line 80 and into extend port 104 of second cylinder 90. This causes stabilizer 84 to pivot to the dashed line position of FIG. 3C. When this is achieved, the user stops pumping and moves selector switch 72 to its "neutral" position (not shown) to keep hydraulic fluid from flowing through either of lines 76, 80.

After transporting load L, selector switch 72 is moved to the "lower" position and handle 74 is pumped forcing hydraulic fluid through lower line 80 so to pressurize extend ports 82, 102. The pressurization of extend port 102 tends to retard the counterclockwise pivotal movement being urged by first hydraulic actuator 52 because stabilizer 84 presses against the underside of platform 50. However, because of the greater torque applied to upper frame portion 12 by first actuator 52, first hydraulic actuator 52 overrides the retarding force from second hydraulic actuator 88 thus causing upper frame portion 14 and load L therewith to pivot counterclockwise and return to the orientation of FIG. 3A.

Modification and variation can be made to the disclosed embodiment without departing from the subject of the invention as defined in the following claims. For example, stabilizer 84 could be mounted at a position other than front axle 16 or could be configured to move other than by pivoting. Stabilizer 84 could be configured so that lowering of load L is not opposed by the stabilizer. Also, by having additional hydraulic selector switches one could move stabilizer 84 between the dashed line position of FIG. 3C and the solid line position of FIG. 3C independently of the actuation of first hydraulic actuator 52. This would, of course, be at the expense of the elegant simplicity of the invention illustrated by the disclosed embodiment. If desired first cylinder could be a double-acting cylinder with a retract port connected to lift line 76 so first actuator 52 aids in both the raising and lowering of load L.

I claim:

1. A hand truck comprising:
   a frame including a first, lower portion and a second, upwardly extending portion pivotally mounted to the first portion for movement about a pivot axis between a first, generally upright orientation and a second, rearwardly tilting orientation;
   wheels mounted to the first portion for supporting the frame on a support surface;
   a power source;
   first, axially extendable actuator means, coupled to the power source and mounted between a first position on a first portion of the frame and a second position on the second portion of the frame, for moving the second portion from its second orientation to its first orientation;
   a stabilizer secured to the frame for movement between a support surface engaged orientation and a support surface disengaged orientation, said stabilizer contacting said support surface at a fulcrum point forward of said pivot axis, said stabilizer and said wheels simultaneously supporting said frame on said support surface while in said supprort surface engaged orientation; and
   a second, axially extendable actuator means, coupled to the power source and mounted between a third position on the stabilizer and a fourth position on the frame, for moving the stabilizer into the support surface engaged and disengaged orientations and for moving the second portion from its first orientation to its second orientation.

2. The hand truck of claim 1 wherein the first actuator means includes a first hydraulic cylinder and piston combination.

3. The hand truck of claim 1 wherein the first hydraulic cylinder is mounted to the first portion of the frame.

4. The hand truck of claim 1 wherein the first and second actuator means include first and second hydraulic cylinder and piston rod combinations, respectively, the second hydraulic cylinder including first and second ports and the first hydraulic cylinder including a third port.

5. The hand truck of claim 4 wherein the power source includes a source of pressurized hydraulic fluid.

6. The hand truck of claim 5 wherein the hydraulic fluid is selectively coupled to the second and third ports simultaneously.

7. The hand truck of claim 6 wherein the second and third ports are both retract ports so that applying hydraulic fluid to the second and third ports tends to cause the first and second piston rods to retract.

8. The hand truck of claim 1 wherein the second actuator includes a second piston and cylinder combination.

9. The hand truck of claim 8 wherein the fourth position is on the second portion of the frame.

10. The hand truck of claim 1 wherein the stabilizer is pivotally mounted to the frame.

11. The hand truck of claim 1 wherein the stabilizer is pivotally mounted to the frame for pivotal movement about said pivot axis.

12. A hand truck comprising:
    a frame including a first, lower portion and a second, upwardly extending portion pivotally mounted to the first portion for movement about a pivot axis between a first, generally upright orientation and a second, rearwardly tilting orientation;
    wheels mounted to the first portion for supporting the frame on a support surface;
    a first hydraulic actuator, including a first cylinder and a first piston rod, the first cylinder pivotally mounted to the first frame portion at a first position, the first piston rod pivotally mounted to the second frame portion at a second position;
    a stabilizer pivotally mounted to the frame for movement between a support surface engaged orientation and support surface disengaged orientation, the stabilizer sized to engage the support surface at a position forward of the pivot axis, and stabilizer and said wheels simultaneously supporting the frame on the support surface while in the support surface engaged orientation;
    a second hydraulic actuator, including a second cylinder and a second piston rod, the second piston rod pivotally mounted to the stabilizer at a third position, the second cylinder pivotally mounted to the second frame portion at a fourth position, the fourth position being between the pivot axis and the second position;
    the first and second hydraulic cylinders each including a piston rod extend port and the second cylinder including a piston rod retract port;
    a source of pressurized hydraulic fluid;
    a first means for directing pressurized hydraulic fluid from the source to the piston rod retract port to bias the stabilizer towards its support surface engaged position and to bias the second frame portion towards its second, rearwardly tilting orientation; and
    second means for directing pressurized hydraulic fluid from the source to both piston rod extend ports to bias the stabilizer towards its support surface disengaged position and to bias the second frame portion towards its first, generally upright, orientation.

* * * * *